United States Patent Office 2,731,350
Patented Jan. 17, 1956

2,731,350

PIE DOUGH AND METHOD OF MANUFACTURE THEREOF

Emil A. Busch, Sturgeon Bay, Wis.

No Drawing. Application January 2, 1952,
Serial No. 264,694

4 Claims. (Cl. 99—92)

This invention relates to an improvement in pie dough and method of manufacture thereof.

Inasmuch as the improved pie dough made in accordance with this invention will keep indefinitely, with or without refrigeration, it is possible to market it in tins or other packages, preferably sealed and sterile, so that users of pie dough may keep prepared dough on hand in a form which requires no mixing preliminary to its use.

Another advantage of the improved pie dough of the present invention lies in the fact that it not only produces a high grade, flaky pie crust which is invariably good, but it produces the same grade of crust regardless of the amount of handling or the number of times it is rolled out prior to baking. In these respects, it differs sharply from ordinary pie dough which, as is well known, is regarded as being difficult to make and is generally spoiled if much handled or rolled out more than once.

My improved pie dough uses a "high ratio" vegetable oil shortening, which is mixed, desirably, in greater than usual proportions with the flour, salt and sugar and is creamed before any liquid is added. The shortening is believed to be adsorbed upon the surfaces of all the dry ingredients to enclose and protect these. It is believed that the unusual characteristics above described are attributable to the protective coating thus achieved. As soon as the shortening and dry ingredients have been thoroughly creamed, water is added and the mixing continued until the mix has the consistency of soft putty.

In practice, I use sterile water and I seal the dough in a sterile container. However, no mold will develop on its surface for periods of many weeks, regardless of storage temperatures.

A typical formula for the production of pie dough in accordance with this invention is as follows:

5 lbs. all purpose flour
2 lbs. 12 oz. vegetable shortening (high ratio)
3 oz. salt
4 oz. sugar
1 lb. 2 oz. boiled water reduced to room temperature In practice, all of the ingredients other than the water are creamed by mechanically mixing them at room temperatures. With a mixer operating at about 72 R. P. M., this will require about one and one half minutes at the temperatures and in the quantities specified. When the water-free mix reaches a creamy stage readily identifiable as such, the water is immediately added and the mixing continued for about a half minute more until the mass becomes the consistency of soft putty. The dough is now complete and may be used, stored, or packaged.

The relative importance of the various features above discussed may be indicated as follows:

While the foregoing proportions are the best known to me, they are not regarded as critical in the sense that slight variations will result in failure. However, the proportion of shortening should not be substantially decreased. And if proportions are changed, a compensatory change in mixing speed and/or time may be required to reach the creamed state.

It is desirable to use water and not milk. In commercial practice, the water is sterilized by boiling but this is probably non-essential, inasmuch as I have successfully kept the mix indefinitely in the open. No development of mold has ever been observed. The principal advantage in keeping the mix sealed is to prevent surface toughening due to evaporation of moisture.

The only shortening used should be the so-called high ratio shortening. Commercial examples are the "Bakerite" of Wilson and Co., Inc., a hydrogenated shortening of animal fats and vegetable oils with monoglycerides and diglycerides added, and the "Kre-Mor" high absorption hydrogenated shortening of Armour & Co. The proportion of shortening used may be higher than indicated in the above formula, although the proportion of shortening in the formula is already high as compared with conventional recipes. It is believed that, during the initial creaming, the vegetable oil coats all of the wheat to protect it against spoilage. The amount of oil used must be sufficient so that each particle of wheat will have oil adsorbed upon its surface.

When the shortening contains not more than $2/100$ of 1% of butylated hydroxyanisole, $1/100$ of 1% propyl gallate and $5/1000$ of 1% of citric acid, in propylene glycol, are added as a preservative. It is recommended, for best results to store between 70 and 80 degrees Fahrenheit.

The pie dough may be rolled out and used to make pie shells immediately or it may be kept in a closed or open container. The shells are desirably baked at 350 to 400 degrees F. They bake to a golden, flaky crust regardless of the time or conditions of storage and regardless of how many times the dough may have been rolled and re-rolled in preparation of the pie shell.

I claim:

1. A method of making pie dough which comprises the creaming of the required flour, salt, and sugar with a high ratio shortening, in the absence of water, by thoroughly mixing the specified ingredients dry until their individual identities become invisible in the creamy mass, immediately followed by the addition of requisite water and further mixing until the water has disappeared and the mix is again creamed to the consistency of soft putty.

2. A method of preparing pie dough which comprises the vigorous mixing, in the absence of water, of a high ratio shortening with flour, sugar, and salt in the approximate proportion of five pounds of flour to two pounds twelve ounces of shortening to four ounces of sugar and three ounces of salt, mixing being continued until the said ingredients can no longer be identified visually in a creamy mass resulting from the mixing, the immediate subsequent addition of sterile water in the approximate ratio to the above specified quantities of ingredients of about one pound two ounces and the further mixing of the ingredients with the water until the mix reaches the consistency and appearance of soft putty.

3. As a new article of manufacture, a pie dough which may be prepared in final usable form and thereafter stored for long periods of time without deterioration and bakes to a flaky crust and can be worked repeatedly without toughening, said dough comprising a high ratio shortening adsorbed upon, and coating, substantially dry particles of flour, salt, and sugar by the process of creaming, the resulting coated dry particles being again creamed with water until a putty-like consistency is reached.

4. As a new article of manufacture, a package comprising in a substantially moisture-impervious container, a pie dough which may be prepared in final usable form and thereafter stored for long periods of time without deterioration and will keep indefinitely and which may be worked repeatedly without toughening and will bake to a brown flaky and tender crust, said dough comprising a mix of the approximate consistency of soft putty which includes sterile water together with flour, salt, and sugar upon the dry particles of which a high ratio shortening is adsorbed, the shortening being uniformly distributed throughout the mix in adsorbed form and in particles smaller than are visible to the unaided eye.

References Cited in the file of this patent

UNITED STATES PATENTS

| | | |
|---|---|---|
| 1,988,058 | Traller | Jan. 15, 1935 |
| 2,499,586 | Johnson | Mar. 7, 1950 |

OTHER REFERENCES

"Encyclopedic Cookbook," by Ruth Berolzheimer, 1948, Grosset and Dunlap, New York, page 565.

"Oil and Fat Products," by Bailey, Interscience Publishers, Inc., New York, New York, 1945, pages 244 and 245.